Sept. 6, 1932.  T. J. SMULSKI  1,875,896
WINDSHIELD CLEANING DEVICE
Filed Oct. 21, 1929
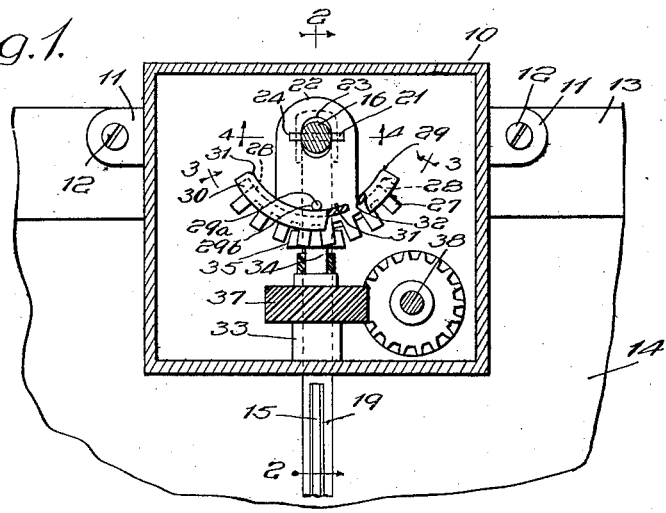
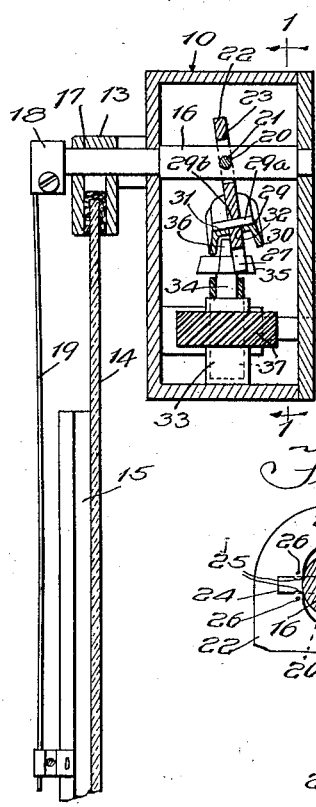
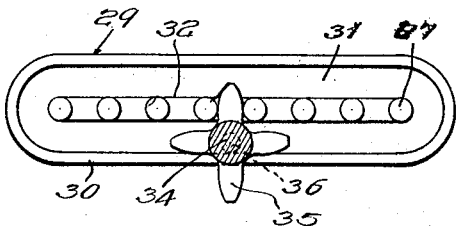
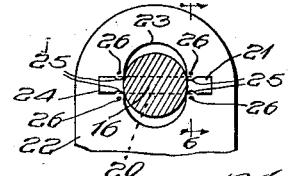
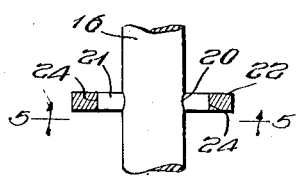
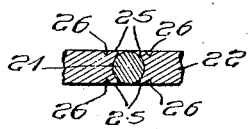

Patented Sept. 6, 1932

1,875,896

UNITED STATES PATENT OFFICE

THEODORE J. SMULSKI, OF LAKE ZURICH, ILLINOIS, ASSIGNOR TO THE ANDERSON CO., OF GARY, INDIANA, A CORPORATION OF INDIANA

WINDSHIELD CLEANING DEVICE

Application filed October 21, 1929. Serial No. 401,151.

This invention relates to driving mechanism, and particularly to a novel construction and arrangement of elements for operating the windshield cleaning devices of motor vehicles such as automobiles, or the like.

One object of the present invention is to provide a novel and practical structure for operating the squeegee of a windshield wiper.

Another object of the invention is to provide novel means for converting a rotary motion into an oscillating movement for operating a squeegee.

Another object of the invention is to provide a simple, efficient and practical device of the character described, which is also cheap to manufacture.

A further object of the invention is to provide a structure which is compact, occupying a minimum of space and which may be readily installed or mounted on a windshield frame, or the like, for the purpose herein described.

A still further object of the invention is to improve devices of the character disclosed in sundry details hereinafter described and particularly pointed out in the appended claims.

One embodiment of the invention is shown for illustrative purposes in the accompanying drawing in which Fig. 1 is a rear sectional elevational view through a portion of the device, taken substantially as indicated by the line 1—1 of Fig. 2;

Fig. 2 is a side sectional elevational view taken substantially as indicated by the line 2—2 of Fig. 1;

Fig. 3 is an enlarged detail bottom plan view of a curved or arcuate pin-tooth rack and pinion illustrated in Figs. 1 and 2, the view being taken substantially as indicated by the line 3—3 of Fig. 1;

Fig. 4 is an enlarged detail sectional bottom plan view through the connection of the pin-tooth rack with the oscillating squeegee shaft, the view being taken substantially as indicated by the line 4—4 of Fig. 1;

Fig. 5 is a sectional elevation taken on the line 5—5 of Fig. 4; and

Fig. 6 is a sectional elevation taken on the line 6—6 of Fig. 5.

In the illustrative embodiment of the invention shown in the drawing, the present structure comprises a support or housing 10 having apertured ears 11 formed thereon adapted to receive bolts 12 by which the housing or support may be suitably mounted on and attached to a windshield frame 13, or the like, in which is mounted the usual transparent glass shield 14.

For operating the squeegee 15 of the windshield cleaner device in a manner to cause the squeegee to pass over the surface of the glass, a rock shaft 16 is suitably mounted in bearings formed in the housing 10 and adapted to extend through an aperture 17 formed in the windshield frame 13, the outer or forward end of the shaft 16 being provided with a clamp or fitting 18 carrying, preferably, a resilient arm 19 on which the squeegee is mounted.

Suitably mounted in a transversely extending aperture 20 formed in the rock shaft 16 and preferably in a manner to rotate therein is a pin 21 having its end portions extending laterally on opposite sides of the shaft as indicated in Figs. 1, 4 and 5, and mounted on the pin 21 is an arm 22 having an elongated longitudinally extending aperture 23 formed therein adapted to receive the shaft 16, and oppositely disposed recesses 24 communicating with the aperture 23 and adapted to receive the end portions of the pin 21.

In the present structure, the arm 22 is shown as having a thickness substantially equal to the diameter of the pin 21 as illustrated in Figs. 2, 4 and 6, and the present invention contemplates a novel means for securing the arm 22 to the pin 21 in a manner to prevent displacement of the arm with respect thereto. As best illustrated in Figs. 5 and 6, this means comprises the flange or shoulder portions 25 formed from the material of the arm 22 and which may be formed by placing a suitable tool such as a center punch, or the like, (not shown) at the points indicated by the numeral 26, and by striking the punch or other tool, a portion of the material of the arm 22 will be forced toward the recesses 24 and against the periphery of the pin 21 in a manner to provide the flange or shoulder portions 25, thereby securing the arm 22 against relative displacement with respect to the pin 21.

Carried by the lower or free end of the arm 22, and shown in the present instance as formed integrally therewith, is a rack 27 preferably of the pin-tooth type, the rack and teeth thereof in the present structure being formed substantially on an arc struck from the center of rotation of the rock shaft 16, and having end portions 28 adapted to extend a substantial distance outwardly from the longitudinal edges of the arm 22. Operatively related to the rack 27 is an arcuate guide member 29 having a curvature corresponding substantially to that of the rack 27, and comprising a flange portion 30 and top portion 31, the top portion 31 being provided with an elongated slot or aperture 32 adapted to receive the arm 22 in a manner to cause the outer end portions of the top portion 31 to rest on the portions 28 of the rack 27, thus spacing the flange 31 from the rack 27 in a manner to form a continuous channel between the flange and rack, the channel being adapted to completely surround the rack 27 as clearly shown in Figs. 1, 2 and 3.

For suitably securing the guide member 29 in position and against displacement with respect to the rack 27, a pin 29a may be positioned in an aperture 29b extending transversely through the arm 22 in a manner to snugly engage the upper surface of the top portion 31 of the rack and securely hold the guide member against the portions 28 of the rack 27.

Suitably mounted in a bearing 33 formed in the housing 10 is a rotatable drive shaft 34 shown in the present instance as having a vertical axis of rotation extending transversely to the axial line of the rock shaft 16, and having a toothed pinion 35 suitably secured to its upper end and adapted to mesh with the pin teeth of the rack 27.

For maintaining proper engagement of the teeth of the pinion with those of the rack 27, the shaft 34 is provided with a portion 36 having an axis preferably coincident with the axis of rotation of the shaft 34 and adapted to extend into the channel formed between the flange 30 and rack 27. Thus, it will be observed that as the pinion 35 is rotated in a manner to move the rack with respect thereto, the portion 36 will follow the channel formed by the flange 30 and rack 27, and when the extreme end teeth of the rack are engaged by the pinion 35, the rack, by reason of the engagement of the portion 36 with the channel, will be oscillated about the pivot pin 21 to the opposite side of the pinion, thus causing an oscillation of the arm 22 and rock shaft 16 in a manner to impart an oscillating movement to the squeegee 15 across the surface of the glass 14. It will be noted that by such an arrangement, the rack 27 and arm 22 have oscillating movements in planes extending substantially transversely to the axis of the shaft 16 and also longitudinally thereof.

As illustrated in the embodiment shown, the drive shaft 34 may be connected by suitable gearing 37 with a power shaft 38 which in turn may be suitably connected to an electric motor or other suitable source of power (not shown).

It will be observed from the foregoing description that the present invention provides a novel construction and arrangement for operating the squeegee of a windshield wiper and for converting a rotary motion into an oscillating movement for the purposes described. Also, that the present invention provides a simple, efficient and practical device which is compact, cheap to manufacture and which may be installed or mounted on a windshield frame, or the like.

Obviously, the present invention is not limited to the precise construction and arrangement shown and described as the same may be variously modified. Moreover, all the features of the invention need not be used conjointly as the same may be used to advantage in variously different combinations and sub-combinations.

What I claim as new and desire to secure by Letters Patent is:

1. In a device of the class described, the combination of a support adapted for attachment to the windshield frame of a motor vehicle, a drive shaft rotatably mounted therein, a second shaft mounted in said support and extending transversely to the axial line of rotation of said drive shaft, and means pivotally mounted on said second shaft in a manner to oscillate in a plane extending longitudinally thereof and operatively related to said drive shaft for oscillating said second shaft when said drive shaft is rotated.

2. In a device of the class described, the combination of a support adapted for attachment to the windshield frame of a motor vehicle, a drive shaft rotatably mounted therein, a second shaft mounted in said support and extending transversely to the axial line of rotation of said drive shaft, an arm pivotally mounted on said second shaft, and means operatively related to said arm and drive shaft for oscillating said arm in planes extending substantially transversely to the axial line of said second shaft for oscillating said last mentioned shaft when said drive shaft is rotated.

3. In a device of the class described, the combination of a support adapted for attachment to the windshield frame of a motor vehicle, a drive shaft rotatably mounted therein, a second shaft mounted in said support and extending transversely to the axial line of rotation of said drive shaft, an arm pivotally mounted on said second shaft, and means carried by said arm and operatively related to said drive shaft for oscillating said arm in planes extending longitudinally and substantially transversely of the axial line of said second shaft for oscillating said last mentioned shaft when said drive shaft is rotated.

4. In a device of the class described, the combination of a support adapted for attachment to the windshield frame of a motor vehicle, a drive shaft rotatably mounted therein, a second shaft mounted in said support and extending transversely to the axial line of rotation of said drive shaft, an arm mounted on said second shaft on a pivot extending transversely to the axial line thereof, and means carried by said arm and operatively related to said drive shaft for oscillating said arm in planes extending longitudinally and substantially transversely of the axial line of said second shaft for oscillating said last mentioned shaft when said drive shaft is rotated.

5. In a device of the class described, the combination of a housing adapted for attachment to the windshield frame of a motor vehicle, a drive shaft rotatably mounted therein, a rock shaft mounted in said housing, a rack pivotally mounted on said rock shaft, and means carried by said drive shaft and cooperable with said rack for oscillating said rock shaft when said drive shaft is rotated.

6. In a device of the class described, the combination of a housing adapted for attachment to the windshield frame of a motor vehicle, a drive shaft rotatably mounted therein, a rock shaft mounted in said housing, a curved rack pivotally mounted on said rock shaft on a pivot extending transversely to the axial line thereof, and means carried by said drive shaft and cooperable with said rack for oscillating said rock shaft in its bearings when said drive shaft is rotated.

7. In a device of the class described, the combination of a housing adapted for attachment to the windshield frame of a motor vehicle, a drive shaft rotatably mounted therein, a rock shaft mounted in said housing and extending transversely to the axial line of rotation of said drive shaft, a curved pin-tooth rack pivotally mounted on said rock shaft on a pivot extending transversely to the axial line thereof, a guide member operatively related to said rack in a manner to form a channel, a pinion carried by said drive shaft and cooperable with said rack for oscillating said rock shaft in its bearings when said drive shaft is rotated, and means associated with said drive shaft adapted to extend into said channel in a manner to be relatively movable with respect thereto for retaining said pinion in engagement with said rack during the rotation of said drive shaft.

8. In a device of the class described, the combination of a housing adapted for attachment to the windshield frame of a motor vehicle, a vertically disposed drive shaft rotatably mounted therein, a horizontally disposed rock shaft mounted in said housing, a curved pin-tooth rack pivotally mounted on said rock shaft on a pivot extending transversely to the axial line thereof, a guide member operatively related to said rack and cooperable therewith in a manner to form a continuous channel surrounding said rack, a pinion carried by said drive shaft and cooperable with said rack for oscillating said rock shaft in its bearings when said drive shaft is rotated, and means associated with said drive shaft and having an axis substantially coincident with the axis of rotation thereof, said means being adapted to extend into said channel in a manner to be relatively movable with respect thereto for maintaining said pinion in engagement with alternate sides of said rack during the rotation of said drive shaft.

9. In a device of the class described, the combination of a housing adapted for attachment to the windshield frame of a motor vehicle, a drive shaft rotatably mounted therein, a rock shaft mounted in said housing, a curved rack having an arm pivotally mounted on said rock shaft on a pivot extending transversely to the axial line thereof, a guide member operatively related to said rack, means cooperable with said member and arm for securing the member with respect to said rack in a manner to form a continuous channel surrounding the rack, a pinion carried by said drive shaft and cooperable with said rack for oscillating said rock shaft in its bearings when said drive shaft is rotated, and means cooperable with said member for maintaining said pinion in engagement with said rack during the rotation of said drive shaft.

10. In a device of the class described, the combination of a housing adapted for attachment to the windshield frame of a motor vehicle, a drive shaft rotatably mounted therein, a rock shaft mounted in said housing, a curved rack having an arm pivotally mounted on said rock shaft on a pivot extending transversely to the axial line thereof, a guide member having a flange surrounding said rack and a top portion cooperable with a portion of the rack for supporting said flange thereon, said top portion having an aperture formed therein adapted to receive said arm, a pin cooperable with said top portion and arm for securing said member and flange with respect to the rack in a manner to form a continuous channel surrounding the rack, a pinion carried by said drive shaft and cooperable with said rack for oscillating said rock shaft in its bearings when said drive shaft is rotated, and means cooperable with said flange for maintaining said pinion in engagement with the rack during the rotation of said drive shaft.

11. In a device of the class described, the combination of a support adapted for attachment to the windshield frame of a motor vehicle, a drive shaft rotatably mounted therein, a rock shaft mounted in said support and extending transversely to the axial line of rotation of said drive shaft, a pin mounted in said rock shaft, an arm having formed therein an aperture and a recess adapted to receive said rock shaft and pin, respectively, means for retaining said pin in said recess, an arcuate rack carried by the free end of said arm, a pinion on said drive shaft adapted to engage said rack, and means for maintaining said rack and pinion in operative engagement.

12. In a device of the class described, the combination of a support adapted for attachment to the windshield frame of a motor vehicle, a drive shaft rotatably mounted therein, a rock shaft mounted in said support and extending transversely to the axial line of rotation of said drive shaft, a transversely disposed pivot pin mounted in said rock shaft, an arm having formed therein an aperture and recess adapted to receive said rock shaft and pin, respectively, means for retaining said pin in said recess, an arcuate rack formed integral with the free end of said arm, a pinion on said drive shaft adapted to engage said rack at both sides and ends thereof, and means carried by said arm anl drive shaft, respectively, for maintaining said rack and pinion in operative engagement.

13. In a device of the class described, the combination of a support adapted for attachment to the windshield frame of a motor vehicle, a drive shaft rotatably mounted therein, a rock shaft mounted in said support and extending transversely to the axial line of rotation of said drive shaft, a transversely disposed pivot pin loosely mounted in said rock shaft and extending on opposite sides thereof, an arm having formed therein an aperture and oppositely disposed recesses communicating with said aperture adapted to receive said rock shaft and the end portions of said pin, respectively, means formed integral with said arm for retaining said pin in said recesses, a curved rack carried by the free end of said arm, a pinion on said drive shaft adapted to engage said rack, and means for maintaining said rack and pinion in operative engagement.

14. In a power transmitting device, the combination of a support, a drive shaft mounted therein, a rock shaft mounted in said support, a rack pivotally mounted on said rock shaft, and means carried by said drive shaft and cooperable with said rack for oscillating said rack and rock shaft.

15. In a power transmitting device, the combination of a support, a drive shaft mounted therein, a rock shaft mounted in said support and extending transversely to the axial line of rotation of said drive shaft, a curved rack pivotally mounted on said rock shaft on a pivot extending transversely to the axial line thereof, and a pinion carried by said drive shaft and cooperable with said rack for oscillating the rack in planes extending substantially transversely and longitudinally of said rock shaft in a manner to oscillate the rock shaft in its bearings.

16. In a device of the class described, the combination of a support adapted for attachment adjacent to the windshield of a motor vehicle, a drive shaft rotatably mounted therein, a second shaft mounted in said support and extending substantially transversely to the axial line of rotation of said drive shaft, and means mounted on said second shaft and having an outer extremity swingable to oscillate in a plane extending substantially longitudinally of said second shaft and operatively related to said drive shaft for oscillating said second shaft when said drive shaft is rotated.

17. In a device of the class described, the combination of a housing adapted for attachment adjacent to the windshield of a motor vehicle, a drive shaft rotatably mounted therein, a second shaft mounted in said housing and extending at an angle to the axial line of rotation of said drive shaft, and means mounted on said second shaft and having an outer extremity swingable to oscillate in a plane extending substantially longitudinally of said second shaft and operatively related to said drive shaft for oscillating said second shaft when said drive shaft is rotated.

In witness whereof, I hereunto subscribe my name this 14th day of October A. D., 1929.

THEODORE J. SMULSKI.